United States Patent
Venkateswaran

(10) Patent No.: US 8,429,280 B2
(45) Date of Patent: Apr. 23, 2013

(54) SYSTEMS AND METHODS FOR MAINTAINING A MEASURE OF SESSION TIME ON A NETWORKED DEVICE

(75) Inventor: Vijay Venkateswaran, Fairfax, VA (US)

(73) Assignee: Time Warner Cable Inc., New York, NY (US)

( * ) Notice: Subject to any disclaimer, the term of this patent is extended or adjusted under 35 U.S.C. 154(b) by 78 days.

(21) Appl. No.: 13/096,028

(22) Filed: Apr. 28, 2011

(65) Prior Publication Data

US 2012/0278474 A1    Nov. 1, 2012

(51) Int. Cl.
*G06F 15/16* (2006.01)
(52) U.S. Cl.
USPC .......................................................... 709/227
(58) Field of Classification Search ............ 709/227
See application file for complete search history.

(56) References Cited

U.S. PATENT DOCUMENTS

| | | | | |
|---|---|---|---|---|
| 7,099,934 B1 * | 8/2006 | Ewing et al. | .................. | 709/223 |
| 7,167,705 B2 * | 1/2007 | Maes | .......................... | 455/432.1 |
| 7,315,740 B2 * | 1/2008 | Maes | .......................... | 455/432.1 |
| 7,536,184 B2 * | 5/2009 | Poczo | ......................... | 455/432.3 |
| 7,567,809 B2 * | 7/2009 | Ling et al. | ...................... | 455/436 |
| 7,877,090 B2 * | 1/2011 | Maes | .......................... | 455/432.1 |
| 7,899,921 B2 * | 3/2011 | Hill et al. | ....................... | 709/230 |
| 7,904,597 B2 * | 3/2011 | Fu et al. | ......................... | 709/246 |
| 2009/0076995 A1 * | 3/2009 | Uyama et al. | ................... | 706/46 |
| 2010/0138481 A1 * | 6/2010 | Behrens | ......................... | 709/203 |

* cited by examiner

*Primary Examiner* — Alicia Baturay
(74) *Attorney, Agent, or Firm* — The Marbury Law Group, PLLC

(57) ABSTRACT

Systems and methods for maintaining a measure of session time of a networked device. A session between the networked device and a first network is monitored to determine a first session time. The first session time is indicative of a first time increment the networked device is continuously connected to the first network. A next session between the networked device and a second network is monitored to determine a second session time. The second session time is indicative of a second time increment the networked device is continuously connected to the second network. A time interval between termination of the session and commencement of the next session is determined. A rule is applied to determine whether the time interval is less than or equal to a pre-determined value. A session time equal to the sum of the first session time and the second session time is displayed when the time interval is less than or equal to the pre-determined value. A session time equal to the second session time is displayed when the time interval is greater than the pre-determined value.

13 Claims, 5 Drawing Sheets

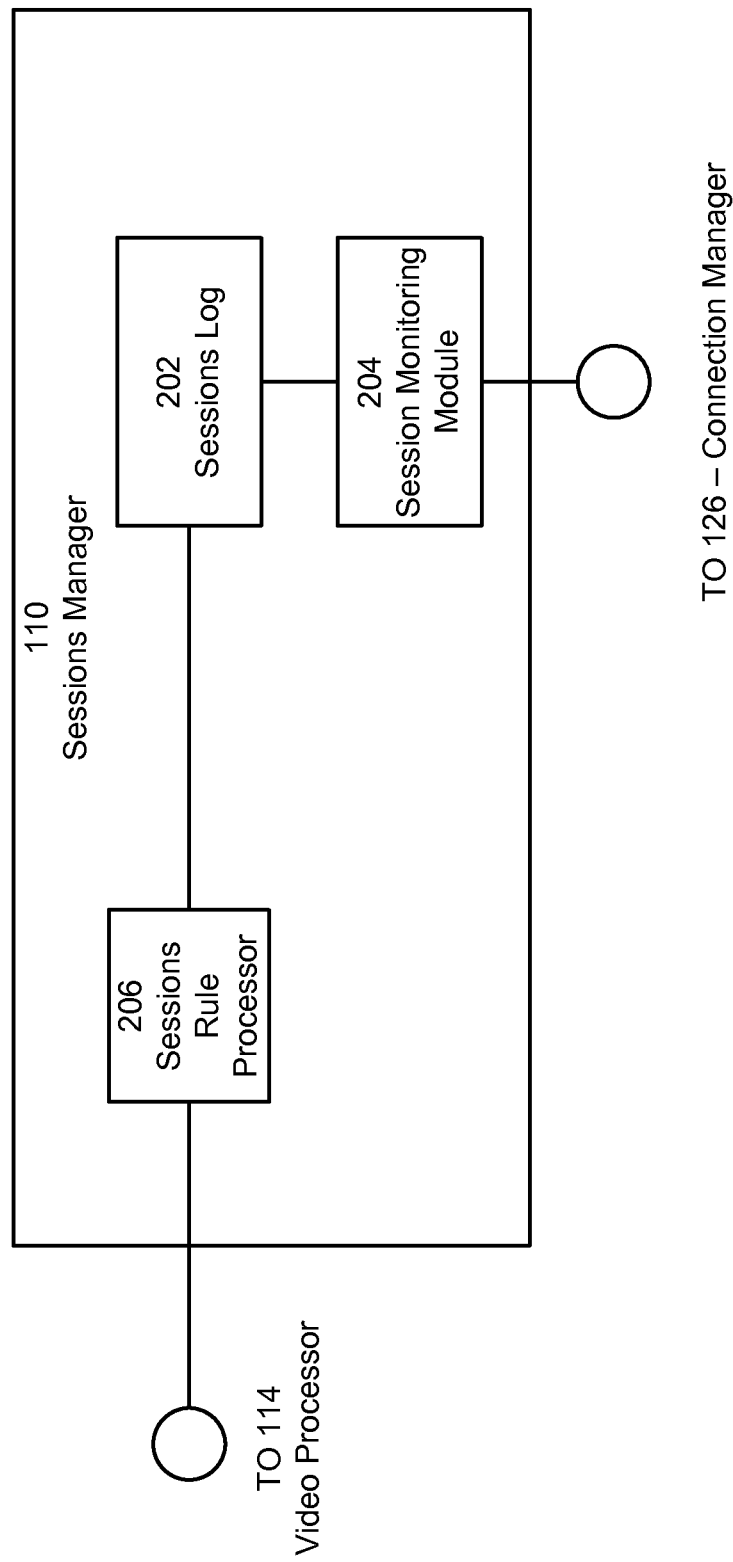

FIG. 4

| Filter By | | | | | | |
|---|---|---|---|---|---|---|
| ☒ Date Range | | | | | ADVANCED | |
| From 4/20/2011 ⊙ | | | | | | |
| To 4/20/2011 ⊙ | | TECHNOLOGY: ALL | | TYPE: ALL | | |
| | | | | APPLY | | |

| Type | Tech | Date/Time | Duration | Total Bytes | Description |
|---|---|---|---|---|---|
| Info | Wi-Fi | 4/20/2011 | 01:22:13 | 47.98MB | Disconnection |
| Warning | Celluar | 4/20/2011 | 11:55:02 | 1.03GB | Lost Connection |
| | | | | | |
| | | | | | |

US 8,429,280 B2

SYSTEMS AND METHODS FOR MAINTAINING A MEASURE OF SESSION TIME ON A NETWORKED DEVICE

BACKGROUND

Internet access is increasingly provided via high speed connections. High capacity data networks are currently offered over cable, fiber connections, and wireless networks. For example, cellular systems operate 3G (CDMA and UMTS/HSPA) and next generation 4G networks that utilize new and efficient protocols, such as Worldwide Interoperability for Microwave Access (WiMAX) and Long Term Evolution (LTE) among others to provide increasing bandwidth and coverage.

A networked device, such as a portable computer, a tablet, a smartphone, a laptop or a mobile device, may be entitled to connect to more than one network. The choice of the network may be determined by rules that are enforced by a connection manager. For example, when multiple networks are available, a rule might direct a networked device to select a network in a certain order, such as Wi-Fi, then 4G, then 3G. The connection manager may be embedded (or reside) within the networked device, or removably installed on the networked device to facilitate access by the networked device to the available networks that the networked device is entitled to use.

Network availability may be dynamic. A network may suddenly become unavailable because of a network outage, because the networked device moved out of range of the network or because the networked device moved in range of a more desirable network. When connected to a wireless network through a networked device, a user may want to keep track of his or her session usage and time. For example, a user may travel with a networked device that establishes temporary connections with multiple wireless networks. A wireless connection may initially be provided on a 3G network. This connection may be terminated because of the mobile user moving out range of the 3G network or because the mobile device has determined that a better signal is provided by another network, such as a 4G network. The transition between the 3G and the 4G network may be unnoticed by the user of the mobile device. From the perspective of the user, the Internet/data session is continuous. However, the networked device will log two distinct sessions. Typically, the clock that keeps track of the session time will also be reset as a consequence of the termination of the first session on a different network.

The user of the networked device will not, under these circumstances, have a record of the total session time that the networked device was connected nor of the data usage that matches the user's perception of the session time or the data usage.

SUMMARY

Embodiments are directed to a method for maintaining a measure of session time as a networked device establishes connections with different wireless networks.

DESCRIPTION OF THE DRAWINGS

FIG. 2 is a block diagram illustrating a sessions manager according to an embodiment.

FIG. 4 is a block diagram illustrating a sessions history according to an embodiment.

DETAILED DESCRIPTION

As used herein, "networked device" encompasses a device that either natively or by virtue of functionality of an add-on device may access multiple wireless networks. By way of illustration and not by way of limitation, a networked device may be a portable computing device such as a laptop computer or a tablet, or it may be a telecommunications device such as a smartphone that is capable of connecting to a wireless data network.

As used herein, an "available network" is a network to which a networked device is entitled to connect and that meets or exceeds minimum criteria for connectivity.

As used herein, a "connection manager" is a functional element that may be executed in hardware or software and that applies rules to determine which available network a networked device connects to when more than one network is available and that provides a sessions manager information relating to the status of a network connection.

Figure 1A:
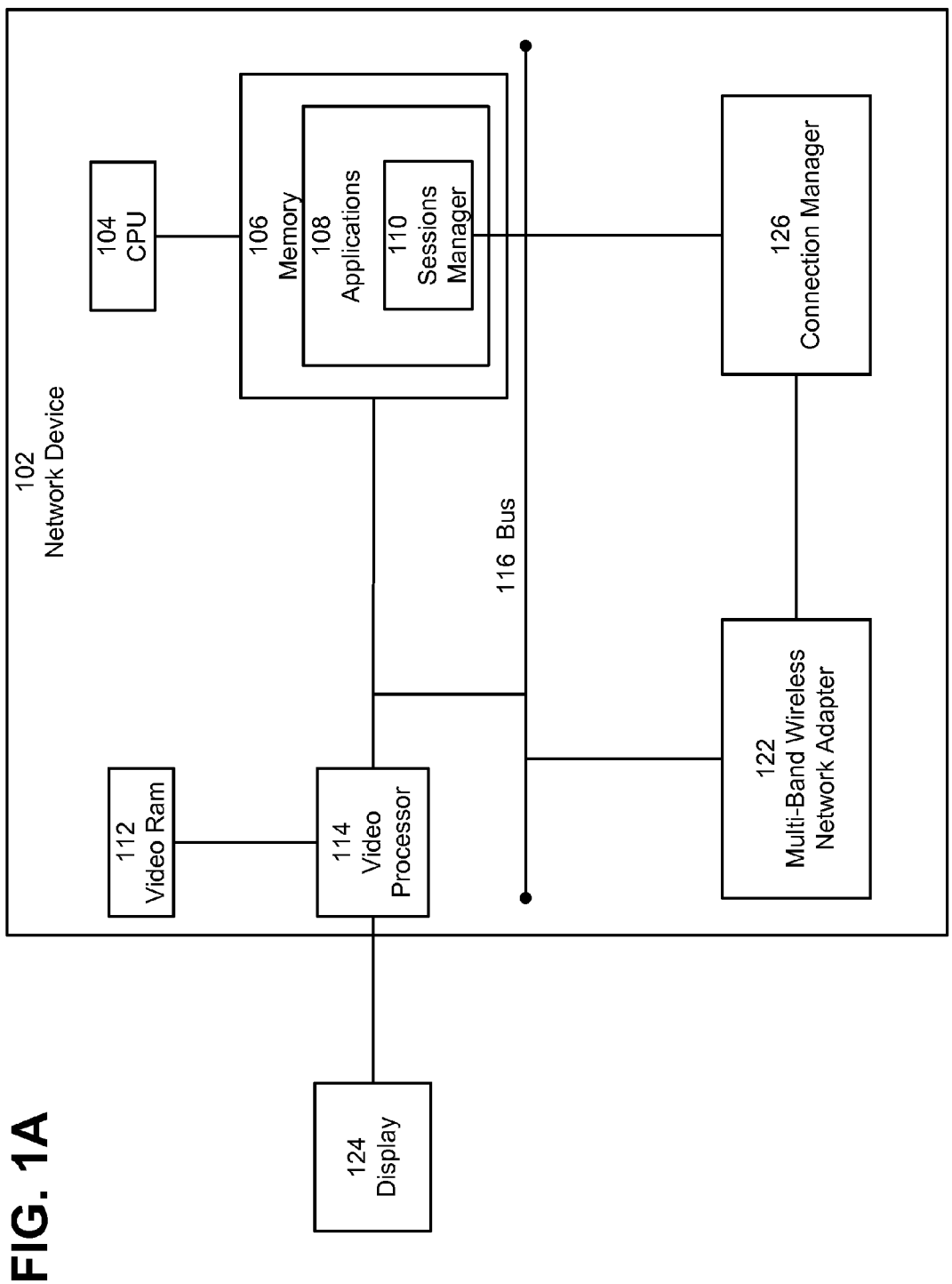
FIG. 1A is a block diagram illustrating selected elements of a networked device including a sessions manager, which is part of a Connection Manager according to an embodiment.

FIG. 1A is a block diagram illustrating selected elements of a networked device including a sessions manager according to an embodiment. The networked device 102 comprises a CPU 104, a memory 106, a video RAM 112, a video processor 114, a bus 116, a multiband wireless network adapter 122 and a connection manager 126.

The various functions described below may be performed by CPU 104 in conjunction with instructions provided to it by other elements. Alternatively, a particular element may include a processor to perform the functions assigned to the particular element.

The networked device 102 may be a computing device in which case the networked device 102 would further comprise applications and hardware elements that provide computing functionality. For example, the networked device 102 may include applications and hardware elements for data storage, data entry, user input, web access, email, and word processing among other functions.

The networked device 102 may also serve to provide voice communications in which case the networked device 102 would further comprise applications and hardware to provide voice communications functionality. For example, the networked device 102 may include applications and hardware for data storage, data entry, user input, web access, email, telephone dialing and voicemail among other functions.

The networked device 102 further comprises a connection manager 126 that applies rules to select a wireless network from available wireless networks which the network device is authorized to use and to facilitate the connection of the networked device 102 to the selected wireless network. The connection manager 126 also manages the reconnection of lost connections and maintains a log of network connection status.

A sessions manager application 110 communicates with or receives communications from the connection manager 126. The sessions manager application 110 is further illustrated in FIG. 2.

Figure 1B:
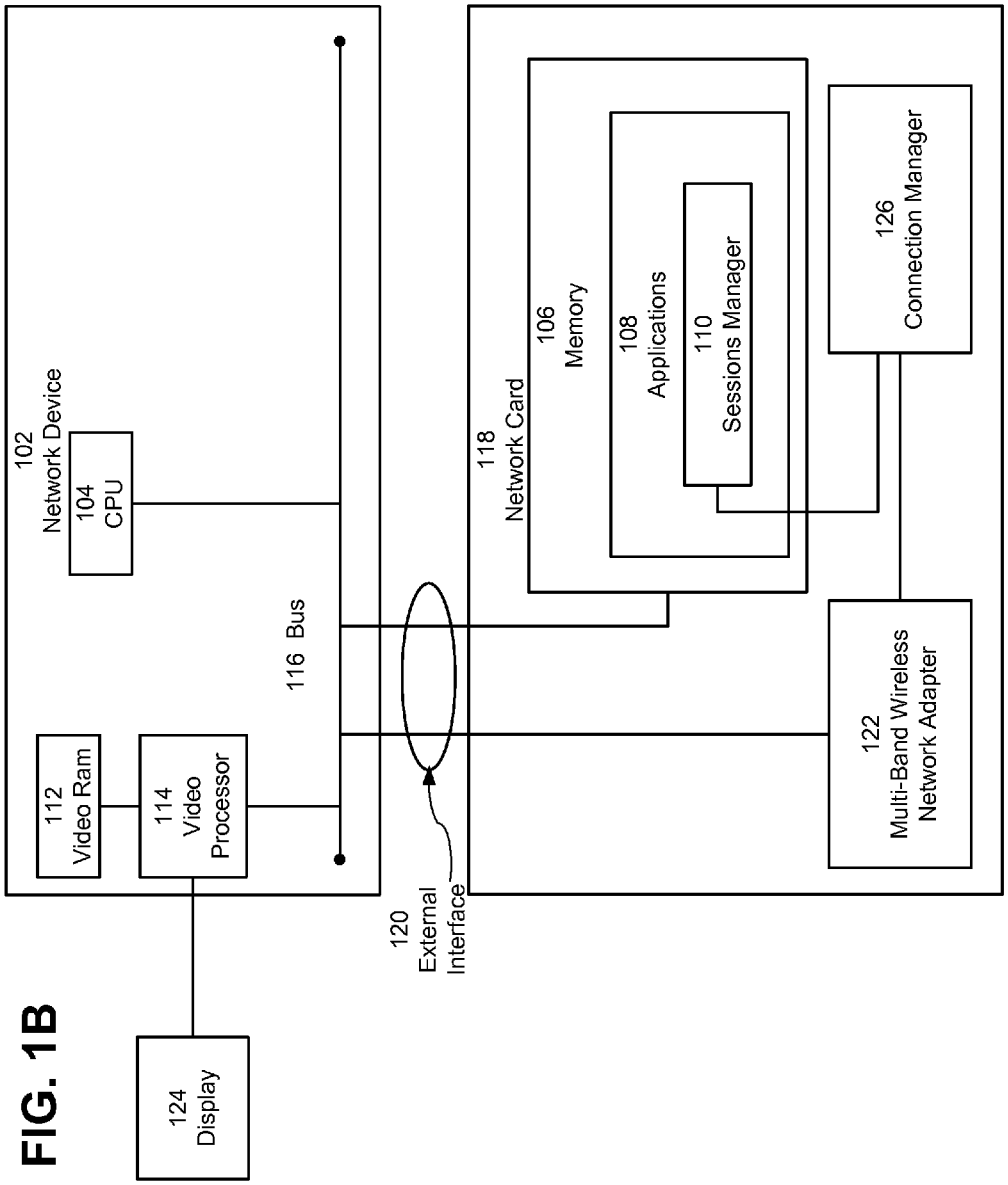
FIG. 1B is a block diagram illustrating selected elements of a networked device connected to a network card that includes a sessions manager according to an embodiment.

Referring again to FIG. 1A, the multiband wireless network adapter 122, the connection manager 126 and the sessions manager application 110 are illustrated as native elements of the networked device 102. However, this is not meant as a limitation. In an embodiment illustrated in FIG. 1B, these elements may be incorporated into a network card 118 and connected to the bus 116 of the networked device 102 via an external interface 120.

For example, network card 118 may connect to the networked device 102 via a USB port, a Peripheral Component Interconnect Express (PCI-E) port, or a mini-PCI-E port.

Referring to FIG. 2, the sessions manager application 110 comprises a sessions monitoring module 204. The sessions monitoring module 204 communicates with the connection manager 126 to monitor the status of the network connection. One task of the sessions manager application 110 is to monitor the time that the multi-band wireless network adapter 122 is connected to a particular network.

In an embodiment, the sessions monitoring module 204 receives (for example, via a message) or acquires (for example, via polling) an alert that a current network connection has been lost. The alert also provides an indication whether the connection was terminated at the direction of the user or lost for any other reason. A session that is not terminated by the user may sometimes be referred to herein as an "interrupted session." The sessions monitoring module 204 provides this time data to a sessions log 202. A sessions rule processor 206 receives or acquires the connection data from the sessions log 202 and processes the data according to rules established by the user, by the provider of the sessions manager, or by the provider of the networked device. In an embodiment, the sessions rule processor 206 produces a graphical display in the form of a sessions usage meter (see FIG. 3).

In an embodiment, the sessions rule processor 206 may apply a rule that measures an elapsed time between a session that was interrupted and the beginning of a next session. An elapsed time threshold may be established that determines whether the two sessions are to be displayed as a continuous session. For example, if the first session is terminated and the next session is automatically instigated within a time period of less than or equal to three minutes, the sessions rule processor 206 may treat the session as continuous and display a continuous session time. If however, the next session does not begin within the elapsed time threshold, the sessions rule processor 206 will treat the session as terminated. In this case, the next session will be treated as a new session having a session time that is independent of the session time of the terminated session.

The threshold referenced in the example provided above is exemplary and is suggested for illustrative purposes. Other thresholds may be established. In an embodiment a threshold may be established within a range of ten seconds to three minutes.

Figure 3:
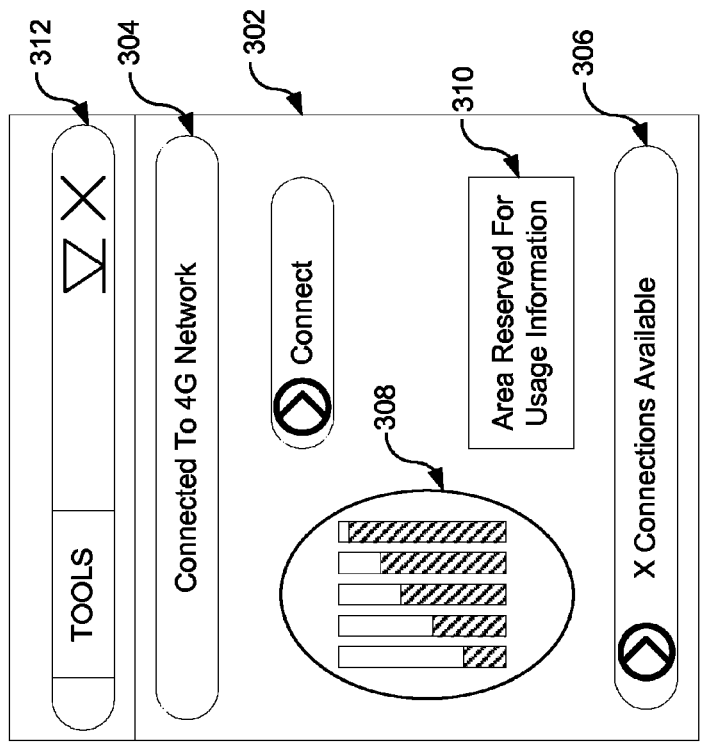
FIG. 3 is a block diagram illustrating a sessions usage meter according to an embodiment.

FIG. 3 is a block diagram illustrating a sessions usage meter according to an embodiment.

In an embodiment, a usage meter 302 is a graphical representation of the status of a current network connection. The graphical representation is displayed on the screen of a networked device and provides the user of the device information such as the network to which the device is connected 304, other connections that are available 306, the signal strength of the current connection 308, and usage information 310. The usage information 310 provides the user the session time based on rules as previously described. A tools icon 312 provides access to additional information regarding session times and session history.

FIG. 4 is a block diagram illustrating a sessions history according to an embodiment. The sessions history may be accessed via the usage meter as previously described. However, this is not meant as a limitation. The sessions history may be accessible via an application or directly via a shortcut or link.

The sessions history provides detailed information regarding the networks accessed over a selected period of time. As illustrated in FIG. 4, the sessions history may be filtered using drop-down menus to allow the user to obtain a report of network usage based on the technology used or the type of entry.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, USB drives or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, USB drive, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for maintaining a measure of a session time of a networked device comprising:
    monitoring by a processor of the networked device a session between the networked device and its connection to a first network to determine a first session time, wherein the first session time is indicative of a first time increment the networked device is continuously connected to the first network;
    monitoring by the networked device processor a next session between the networked device and its connection to a second network to determine a second session time, wherein the second session time is indicative of a second time increment the networked device is continuously connected to the second network;
    determining by the networked device processor a time interval between termination of the session and commencement of the next session;
    applying by the networked device processor a rule to determine whether the time interval is less than or equal to a pre-determined value, wherein the pre-determined value is within a range of ten seconds to three minutes; and
    displaying on the networked device a session time equal to the sum of the first session time and the second session time when the time interval is less than or equal to the pre-determined value.

2. The method of claim 1, wherein the first and second networks are selected from the group consisting of a 3G network, a 4G network, a Worldwide Interoperability for Microwave Access (WiMAX) network, a Wireless Metropolitan Area Network (WMAN), an LTE network, and a Wi-Fi network.

3. The method of claim 1, wherein the networked device is selected from the group consisting of a smartphone, a computer, an electronic tablet, and a personal data assistant.

4. The method of claim 1 further comprising displaying on the networked device a session time equal to the second session time when the time interval is greater than the pre-determined value.

5. A system for maintaining a measure of a session time of a networked device comprising:
    a networked device comprising a processor, a wireless radio and a display;
    a session monitor, wherein the session monitor comprises instructions that are executed on the processor that cause the processor to perform operations comprising:
    monitoring a session between the wireless radio of the networked device and a first network to determine a first session time, wherein the first session time is indicative of a first time increment the networked device is continuously connected to the first network;
    monitoring a next session between the wireless radio of the networked device and a second network to determine a second session time, wherein the second session time is indicative of a second time increment the networked device is continuously connected to the second network;
    determining a time interval between termination of the session and commencement of the next session;
    applying a rule using a sessions rule processor to determine whether the time interval is less than or equal to a pre-determined value, wherein the pre-determined value is within a range of ten seconds to three minutes; and
    displaying on the networked device a session time equal to the sum of the first session time and the second session time when the time interval is less than or equal to the pre-determined value.

6. The system of claim 5, wherein the first and second networks are selected from the group consisting of a 3G network, a 4G network, a Worldwide Interoperability for Microwave Access (WiMAX) network, a Wireless Metropolitan Area Network (WMAN), an LTE network and a Wi-Fi network.

7. The system of claim 5, wherein the networked device is selected from the group consisting of a smartphone, a computer, an electronic tablet, and a personal data assistant.

8. The system of claim 5, wherein the session monitor further comprises instructions that are executed on the processor that cause the processor to perform operations comprising displaying on the networked device a session time equal to the second session time when the time interval is greater than the pre-determined value.

9. A method for maintaining a measure of a session time of a networked device comprising:
    monitoring by a processor of the networked device a session between the networked device and a first network to determine when the session is interrupted;
    monitoring by the networked device processor the session between the networked device and the first network to determine a first session time when the session is interrupted, wherein the first session time is indicative of a first time increment the networked device was continuously connected to the first network before the interruption;
    monitoring by the networked device processor a next session between the networked device and a second network to determine a second session time when the session is interrupted, wherein the second session time is indicative of a second time increment the networked device is continuously connected to the second network after the interruption;

determining by the networked device processor a time interval between termination of the session and commencement of the next session;

applying by the processor a rule to determine whether the time interval is less than or equal to a pre-determined value, wherein the pre-determined value is within a range of ten seconds to three minutes; and displaying on the networked device a session time equal to the sum of the first session time and the second session time when the time interval is less than or equal to the pre-determined value.

10. The method of claim 9, wherein the first and second networks are selected from the group consisting of a 3G network, a 4G network, a Worldwide Interoperability for Microwave Access (WiMAX) network, a Wireless Metropolitan Area Network (WMAN), an LTE network, and a Wi-Fi network.

11. The method of claim 9, wherein the networked device is selected from the group consisting of a smartphone, a computer, an electronic tablet, and a personal data assistant.

12. The method of claim 9 further comprising displaying on the networked device a session time equal to the second session time when the time interval is greater than the pre-determined value.

13. The method of claim 9, wherein determining when the session is interrupted comprises determining that the session was terminated by an event selected from the group consisting of a loss of signal, detection of a stronger signal, and detection of a faster network.

* * * * *